United States Patent Office 2,745,820
Patented May 15, 1956

2,745,820
TRI-BUTYL-TIN-MONO-METHOXIDE AND POLYVINYL CHLORIDE RESIN STABILIZED THEREWITH

Gerry P. Mack, Jackson Heights, N. Y., assignor, by mesne assignments, to Carlisle Chemical Works, Inc., Reading, Ohio, a corporation of Ohio No Drawing. Application June 30, 1949,
Serial No. 102,432

2 Claims. (Cl. 260—45.75)

The invention relates to stabilized chlorine-containing resins and high polymers.

It is known that certain organic lead and tin compounds have a tendency to stabilize such resins, particularly vinyl chloride polymers and copolymers, against discoloration during the compounding and processing and that films and articles made of such stabilized resins show an increased resistance against the deteriorating effects of prolonged exposure to heat and light. All the tin compounds proposed heretobefore as stabilizers have, however, certain inherent drawbacks which reduce their usefulness and efficiency.

Some of the known organic tin stabilizers give off during compounding and processing acid fumes or strong objectionable odors, which odors are carried through in the manufactured goods. Other compounds are decomposed and their decomposition products deteriorate and discolor the finished products. Still other compounds have such a low solubility in organic solvents that they cannot be readily compounded with resins.

I have found a new group of organic tin compounds which have excellent stabilizing properties without the drawbacks associated with the tin compounds used heretofore. The new stabilizers are tin monoalkoxides of the general formula

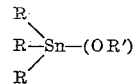

wherein R represents an aryl, alkyl or aralkyl group and OR' is an aliphatic, alicyclic or aryl alkoxy radical. The three R groups may be identical or comprise different alkyl aryl and/or aralkyl groups.

The tin monoalkoxides have a wide range of solubility as they are soluble in most of the common organic solvents and also in most of the plasticizers commonly used in compounding halogen - containing resin compositions. Further advantages are their relatively high vapor pressure and low volatility, their freedom of odor, the absence of objectionable fumes during compounding, and their relative resistance against hydrolysis.

The tin monoalkoxides may be made by causing trialkyl, triaryl, or mixed alkyl aryl tin monohalides to react with an appropriate alkali metal alcoholate under anhydrous conditions.

Examples of tin halides which may be employed in making the alkoxides include trimethyl tin chloride, triethyl tin chloride, tripropyl tin chloride, tributyl tin chloride, triamyl tin chloride, trioctyl tin chloride, trilauryl tin chloride, tri 2-ethylhexyl tin chloride, tribenzyl tin chloride, triphenyl tin chloride, tritolyl tin chloride, trixylyl tin chloride, trinapthyl tin chloride, and others as well as the corresponding bromides.

As alcohols I can use saturated or unsaturated aliphatic branched and straight chain primary, secondary, or tertiary alcohols such as methanol, ethanol, allyl alcohol, propanol, butanol, 2-ethyl hexanol, lauryl alcohol, methyl isobutyl carbinol, tertiary butyl alcohol, and others. Examples of alicyclic alcohols are cyclohexanol, methyl cyclohexanol, dimethyl cyclohexanol, hydroabietyl alcohol, tetrahydrofurfuryl alcohol. It is not necessary that the radicals of the alcohols consist only of hydrocarbon groups; they may contain, or the hydrocarbon chain may be interrupted by, oxygen or sulphur. Ether alcohols and thioether alcohols are examples of such compounds. Also aralkyl alcohols, such as benzyl alcohol, phenyl ethyl alcohol, or cinnamyl alcohol may be used.

The preparation of the alcoholates can be accomplished by causing the alcohol to react with an alkali metal such as sodium, potassium or lithium, or by causing a higher alcohol to react with a lower alkali alkoxide and distilling out the lower boiling alcohol. Another method consists in causing the alcohol to react with an alkali metal hydroxide and removing the water, for instance by azeotropic distillation; still another method consists in causing an anhydrous alcohol to react with an alkali hydride such as sodium hydride whereby hydrogen is liberated and the alkali alkoxide is formed.

Instead of the metal alkoxides, we can also use gaseous ammonia or tertiary amines and anhydrous alcohols for the preparation of the alkoxides.

As solvents for the reaction any anhydrous solvent which does not interfere with the reaction, and which is preferably a solvent for the final product, can be used. For instance, I can dissolve the alkali metal or metal hydride in a large excess of the anhydrous alcohol and remove the excess alcohol after the reaction with a trialkyl or triaryl halide has been completed; or I can prepare alkalialkoxide by one of the above described methods, disperse it in a suitable solvent, such as benzene, toluene, petrolether, ether, dimethylformal, and others and cause it to react with a trialkyl or triaryl tin halide.

The obtained tin monoalkoxides are mostly liquids or waxy solids; they are stable compounds which can be purified by fractional distillation and are soluble in a wide range of organic solvents. Their solubility characteristics allow their incorporation in most plasticizers employed in the compounding of the halogen-containing resins for the stabilization of which they are used, such as: di (2-ethylhexyl) phthalate, dibutyl phthalate, dibutoxyethyl adipate, di(2-ethylhexyl) adipate, dinonyl phthalate, diisooctyl phthalate, dibutyl tetrachloro phthalate, tricresylphosphate, triethylene glycol di 2-ethyl hexoate, and others.

Although it is possible to prepare and isolate the tin monoalkoxides in a pure state, this is not necessary for their use as stabilizers. Therefore, for the preparation of the tin monoalkoxides use can be made of crude trialkyl or triaryl tin monohalides. Such monohalides may be prepared for instance by the disproportionation of tetraalkyl or tetraaryl tin with tin tetrachloride and contain about 90 to 95% trialkyl or triaryl tin halide, the balance being tetraalkyl or tetraaryl tin, dialkyl or diaryl tin dihalide and monoalkyl or monoaryl tin trihalide. The alkoxides prepared from these impure mixtures contain predominantly the monalkoxides but are contaminated with small amounts of chlorine-containing complexes which, however, do not interfere with their stabilizing property.

The crude or purified tin monoalkoxides obtained through the methods described hereinbefore have the advantage over dialkoxides that they are stable and odorless compounds and particularly that they are not readily hydrolized when exposed to moist air. The dialkoxides are in such conditions very unstable compounds decomposing into the hydroxides and oxides which are incompatible with vinyl chloride and similar resins and with cetain plasticizers used in compounding such resins.

Halogen-containing resins, which are made heat and light resistant by the stabilizers of this invention, include polymers of vinyl chloride; copolymers of vinyl chloride with vinyl esters of aliphatic acids, particularly vinyl acetate; copolymers of vinyl chloride with esters of acrylic and methacrylic acids, and with acrylonitrile; copolymers of vinyl chloride with diene compounds and unsaturated dicarboxylic acids or their anhydrides, such as copolymers of vinyl chloride with chlorobutadiene, diethyl maleate, diethyl fumarate or maleic anhydride; after-chlorinated polymers and co-polymers of vinyl chloride; polymers of vinyl chloride with vinylidene chloride and other polymerizable compounds; polymers of vinyl chloroacetate and dichlordivinyl ether; chlorinated polymers of vinyl acetate; and mixtures of the polymers recited herein with each other or other polymerizable compounds.

The amount of tin monoalkoxide used as stabilizer for the above-listed resins will generally range between .5 to 5%, preferably between 1 to 3%, by weight of halogen-containing polymer. The tin monoalkoxides may also be used in combination with other organic substances having stabilizing properties.

It will be apparent that the compounds employed as stabilizers in my invention may also be used to stabilize other halogen-containing resins and rubber-like products, for instance polymers and co-polymers of vinylidene chloride; chlorinated polymeric esters of acrylic and alpha-substituted acrylic acids; polymers of chlorinated styrenes, for instance dichlorostyrene; chlorinated rubber; chlorinated polymers of ethylene; polymers and afterchlorinated polymers of chlorobutadienes, and their copolymers with vinyl chloride; rubber hydrochloride and chlorinated rubber hydrochloride. The corresponding bromides and brominated products are equally well stabilized.

The following examples will serve to illustrate the invention:

Example 1

100 g. of tributyl tin monochloride having a chlorine content of 11.66% were dissolved in 125 cc. of absolute methanol and added to a solution of 17.8 g. of sodium methoxide in 100 cc. of methanol under cooling at 0° C.; the batch was then stirred for two hours at 10–20° C. until the reaction was neutral. The salt formed was filtered off and then the methanol distilled off under reduced pressure. A clear liquid product was obtained having the following characteristics:

|          | Calculated, percent | Found, percent |
|----------|---------------------|----------------|
| Tin      | 36.72               | 36.0           |
| Methoxy  | 6.54                | 6.90           |
| Chlorine |                     | .25            |

Refr. index—1.4801 and B. P.—138–139° at 5 mm.

0.6 g. of this crude undistilled tributyl tin monomethoxide were dissolved in 36.5 g. of di 2-ethylhexyl phthalate and this solution was pasted up with 61.5 g. of vinyl chloride-vinyl acetate copolymer resin having 95% of vinyl chloride and 5% of vinyl acetate and an intrinsic viscosity of 1.53.

The mixture was milled on a rubber mill for ten minutes at 310° F. until a smooth uniform film was obtained. From this film pieces were cut 6 inches by 6 inches 3/16 inch thick and heat pressed for 30 minutes at 345° F. The heat pressed sheets showed no discoloration and were completely clear without the slightest haze, whereas a similar film containing no stabilizer turned dark brown when subjected to the same treatment.

Example 2

Tributyl tin tert. butoxide was prepared by dissolving sodium metal in excess anhydrous tertiary butyl alcohol and causing it to react with tributyl tin monochloride. The obtained tributyl tin tert. butoxide was fractionated. The fraction boiling at 97–96° C. at 1.2 mm. had a tin content of 32.6% (calculated 32.84%). 0.75 g. of this fraction were dissolved in a solution containing 100 g. of a vinyl chloride-vinyl acetate copolymer containing 90% of vinyl chloride and 10% of vinyl acetate, having an intrinsic viscosity of 0.79 in cyclohexanone at 20° C., and 40 g. of dibutoxy ethyl adipate in 860 g. of acetone-butylacetate mixture. Films were cast from this solution which after drying were heated to 160–170° C. for 45 min. No discoloration took place and the films were water clear and completely colorless. Films made of the same but not stabilized mix became dark brown when prepared and heat-treated in the same manner.

Example 3

1 gram of triethyl tin ethoxide having a boiling point of 190–192° C. at atmospheric pressure and a tin content of 47.5% was prepared as outlined in the above examples and added to 100 g. of a copolymer containing 90% vinyl chloride and 10% diethyl maleate mixed with 40 g. of dioctyl sebacate, and the mix was milled for 45 minutes at 350° F. on a rubber mill. The film obtained had only a faint, yellowish tint against a dark brown film of the same resin and plasticizer milled under the same conditions containing no stabilizer.

Example 4

Two parts of tributyl tin benzoxide having a boiling point of 90–95° C. at 1 mm. pressure and a tin content of 29.5% were dissolved in an acetone solution of 100 parts of a copolymer resin containing 60% of vinyl chloride, 40% of acrylonitrile and 25 parts of dinonyl phthalate. Films cast from this solution were thoroughly dried and exposed in a standard fadeometer. The light color of the film was not changed after 250 hours of illumination with a mercury arc lamp.

Example 5

100 parts of vinyl chloride-vinylidene chloride copolymer containing 85% of vinyl chloride and 15% of vinylidene-chloride were milled together with 40 parts of triethyleneglycol di-2-ethylhexoate and 2 parts of triphenyl tin butoxyethoxide having a tin content of 25.4%, for 40 minutes at 345° F. No discoloration took place, whereas the same mix milled without the stabilizer assumed a dark reddish brown discoloration.

Example 6

1 gram of crude tributyl tin cyclohexoxide which was prepared by reacting an impure tributyl tin monochloride with sodium cyclohexoxide and which contained mainly the mono cyclohexoxide and as minor impurities some chlorine-containing complexes was added to a mixture of 50 parts of polyvinyl chloride, 20 parts of dioctyl phthalate and 30 parts of xylene and milled on a ball mill for 24 hours until a uniform smooth resin paste was obtained. This resin paste was applied by knife coating on a cotton cloth, dried to drive off the solvent, then fuse for 15 minutes at 160–165° C. The coating was transparent and almost completely colorless. An identical batch prepared without stabilizer, coated and fused showed a reddish-brown color.

What I claim is:

1. As a new composition of matter a mixture containing a polymerized vinyl chloride plastic composition and .5 to 5 per cent of a tributyl tin monoalkoxide.

2. Tri-butyl tin mono-methoxide.

References Cited in the file of this patent

UNITED STATES PATENTS

| 2,481,086 | Cleverdon et al. | Sept. 6, 1949 |
| 2,489,518 | Burt | Nov. 29, 1949 |

FOREIGN PATENTS

| 590,734 | Great Britain | July 28, 1947 |

OTHER REFERENCES

Krause et al: "Die Chemie der metall-organischen Verbindungen," page 328, published by Gebrudor Borntraeger Berlin, 1937.